(12) United States Patent
Ho et al.

(10) Patent No.: US 10,838,136 B1
(45) Date of Patent: Nov. 17, 2020

(54) ILLUMINATING KEYBOARD

(71) Applicant: CHICONY POWER TECHNOLOGY CO., LTD., New Taipei (TW)

(72) Inventors: Hsuan-Wei Ho, New Taipei (TW); Yueh-Heng Lee, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/707,052

(22) Filed: Dec. 9, 2019

(30) Foreign Application Priority Data

Sep. 20, 2019 (TW) .............................. 108134108 A

(51) Int. Cl.
*F21V 8/00* (2006.01)
*G06F 3/02* (2006.01)

(52) U.S. Cl.
CPC ........... *G02B 6/005* (2013.01); *G02B 6/0055* (2013.01); *G02B 6/0068* (2013.01); *G06F 3/0202* (2013.01)

(58) Field of Classification Search
CPC .... G02B 6/005; G02B 6/0055; G02B 6/0068; G06F 3/0202
See application file for complete search history.

(56) References Cited

U.S. PATENT DOCUMENTS

| | | |
|---|---|---|
| 8,258,984 B2 | 9/2012 | Lee et al. |
| 9,715,975 B2 | 7/2017 | Hsu |
| 2006/0290676 A1* | 12/2006 | Harada ................. G06F 3/0202 345/168 |
| 2009/0045986 A1* | 2/2009 | Fabrenius ............ G02B 6/0021 341/22 |
| 2010/0328108 A1 | 12/2010 | Lee et al. |
| 2015/0198302 A1 | 7/2015 | Liang et al. |
| 2016/0357269 A1* | 12/2016 | Tai ........................ G06F 3/0202 |
| 2019/0171297 A1 | 6/2019 | Lin |
| 2019/0172663 A1 | 6/2019 | Yeh et al. |
| 2020/0041714 A1* | 2/2020 | Takagi ................. G02B 6/0058 |

FOREIGN PATENT DOCUMENTS

| | | |
|---|---|---|
| CN | 103887104 A | 6/2014 |
| CN | 104091713 A | 10/2014 |
| CN | 106298330 A | 1/2017 |
| TW | M328614 U | 3/2008 |

(Continued)

*Primary Examiner* — Mary Ellen Bowman
(74) *Attorney, Agent, or Firm* — Muncy, Geissler, Olds & Lowe, P.C.

(57) ABSTRACT

The present disclosure discloses an illuminating keyboard, which includes a light emitting module, a reflection plate and a light guiding plate. The light emitting module includes a circuit board, a plurality of electronic components, and a plurality of light emitting units. The electronic components and the light emitting units is disposed on the circuit board, the electronic components are collectively disposed in an area, the light emitting units surround the area, and the light from the light emitting units is directed outside the area. The reflection plate has a through hole corresponding to the light emitting units. The light guiding plate is disposed above the reflection plate, and has a slot hole corresponding to the through hole. The light emitting units are accommodated in the space formed by the through hole and the slot hole, and the light guiding plate receives the light from the light emitting units.

15 Claims, 9 Drawing Sheets

(56) References Cited

FOREIGN PATENT DOCUMENTS

| | | |
|---|---|---|
| TW | M373518 | 2/2010 |
| TW | 201201235 A | 1/2012 |
| TW | 201535448 A | 9/2015 |
| TW | M519764 | 4/2016 |
| TW | M528468 | 9/2016 |
| TW | 201703089 A | 1/2017 |
| TW | M535393 U | 1/2017 |
| TW | 201926392 A | 7/2019 |
| TW | 201926393 A | 7/2019 |
| TW | I668392 | 8/2019 |
| TW | I668722 | 8/2019 |

\* cited by examiner

ILLUMINATING KEYBOARD

BACKGROUND

1. Technical Field

The present disclosure relates to an illuminating keyboard, particularly to a light emitting module of an illuminating keyboard.

2. Description of the Related Art

Currently, a plurality of light emitting units being disposed on a flexible circuit board is the common configuration of a light emitting module. The flexible circuit board and the light emitting units are longitudinally disposed through the center of the light guiding plate, such that the light emitted by the light emitting units can be evenly distributed in the light guiding plate. Alternatively, as shown in FIG. 1, which is a schematic diagram of a conventional light emitting module 9 and a light guiding plate 8, a flexible circuit board 91 and the light emitting units 92 are longitudinally disposed on a long side of the light guiding plate 8. The light guiding plate 8 has a plurality of holes 81 to accommodate the light emitting units 92. This design also allows the light emitted by the light emitting units 92 to be evenly distributed in the light guiding plate 8. However, as the requirements for the brightness of the illuminating keyboard becomes higher and higher, the number of light emitting units 92 must be increased, and the number of electronic components 93 (such as resistors and capacitors) must be increased. In order to provide a sufficient amount of light emitting units 92 and electronic components 93, the length or width of the flexible circuit board 91 needs to be increased, and the manufacturing cost of the light emitting module 9 is increased.

In addition, both the computer and its peripheral electronics have been developed towards light and thin design concepts. Similarly, the illuminating keyboard has been designed towards reduction in length, width and thickness, and the space left for the light emitting module 9 (the flexible circuit board 91, the light emitting units 92 and the electronic components 93) has been reduced. However, if the number of the light emitting units 92 is reduced, the keyboard may have a dark area away from the light emitting units 92, resulting in insufficient or uneven brightness. Since the space of the flexible circuit board 91 cannot be reduced any longer under the conventional configuration, there is still room to improve the current lighting module 9.

SUMMARY

In view of the above issues, it is a major objective of the present disclosure to provide an illuminating keyboard. With the novel configuration of the light emitting module and its electronic components and light emitting units, the problem that a conventional illuminating keyboard cannot take care of both the setting space and brightness of the light emitting module can be solved.

To achieve the above objective, the present disclosure provides an illuminating keyboard, which includes a light emitting module, a reflection plate, a light guiding plate, a light-shielding film, and a key module. The light emitting module includes a circuit board, a plurality of electronic components and a plurality of light emitting units. The electronic components are collectively disposed in an area, the light emitting units surround the area on the circuit board, and the light from the light emitting units is directed outside the area. The reflection plate is disposed above the circuit board, and has a through hole corresponding to the light emitting units. The light guiding plate is disposed above the reflection plate and has a slot hole corresponding to the through hole. The light emitting units are accommodated in the space formed by the through hole and the slot hole, and the light guiding plate receives light from the light emitting units. The light-shielding film is disposed above the light guiding plate and has a light emission district. The key module is disposed above the light-shielding film. The light emission district corresponds to the key module. The light is emitted from the light guiding plate and passes through the light emission district, and then is emitted from the key module to the outside.

According to an embodiment of the present disclosure, some of the light emitting units are configured in an arc shape and form a curved opening, and one of the light emitting units is disposed in the curved opening.

According to an embodiment of the present disclosure, the light emitting module further includes a reverse light emitting unit, light emitted from the reverse light emitting unit is in the opposite direction to the light from the light-emitting unit located at the curved opening. Also, the reverse light emitting unit is located adjacent to one end of the light emitting unit located at the curved opening, and the one end is farther away from the curved opening.

According to an embodiment of the present disclosure, the light emitting units and the reverse light emitting unit are located adjacent to one side of the key module.

According to an embodiment of the present disclosure, the configuration of the light emitting units forms a closed shape.

According to an embodiment of the present disclosure, the light emitting units correspond to a central district of the key module.

According to an embodiment of the present disclosure, the electronic components include at least a resistor and at least a capacitor. The shortest distance between the resistor and the light emitting units is greater than the shortest distance between the capacitor and the light emitting units.

According to an embodiment of the present disclosure, the light guiding plate has two short side walls opposite to each other respectively and two long side walls opposite to each other respectively. The light guiding plate further includes a plurality of reflection portions disposed on the two short side walls or the two long side walls.

According to an embodiment of the present disclosure, the reflection portions are disposed on the two long side walls, and each of the reflection portions is located respectively along the normal direction of a light output surface of one of the light emitting units.

According to an embodiment of the present disclosure, the reflection portions have a curved reflection surface respectively.

According to an embodiment of the present disclosure, the reflection portions are disposed on the two short side walls and have an oblique reflection surface facing a designated area of a light guiding plate.

According to an embodiment of the present disclosure, the reflection portions are holes.

According to an embodiment of the present disclosure, the illuminating keyboard further includes a supporting plate disposed under the circuit board and corresponding to the slot hole.

According to an embodiment of the present disclosure, the supporting plate has high thermal conductivity.

As described above, the illuminating keyboard according to the present disclosure includes a light emitting module, a reflection plate, and a light guiding plate. Specifically, the electronic components of the light emitting module are collectively disposed in an area of the circuit board, and the design that the light emitting units are disposed surrounding the area of the circuit board can reduce the size (width or length) of the circuit board to reduce the manufacturing cost of the light emitting module. Moreover, the light guiding plate is designed to only need one slot hole. This makes the design of the optical path of the light emitting units more simplified.

Furthermore, the light emitting units are accommodated in the space formed by the through hole and the slot hole, and the light from the light emitting units are directed outside the area. Therefore, the light emitted by the light emitting units can enter the light guiding plate from the side wall of the slot hole and be directed to the whole light guiding plate to provide sufficient and evenly distributed brightness.

DETAILED DESCRIPTION OF THE PREFERRED EMBODIMENT

Hereafter, the technical content of the present disclosure will be better understood with reference to preferred embodiments.

Figure 1:
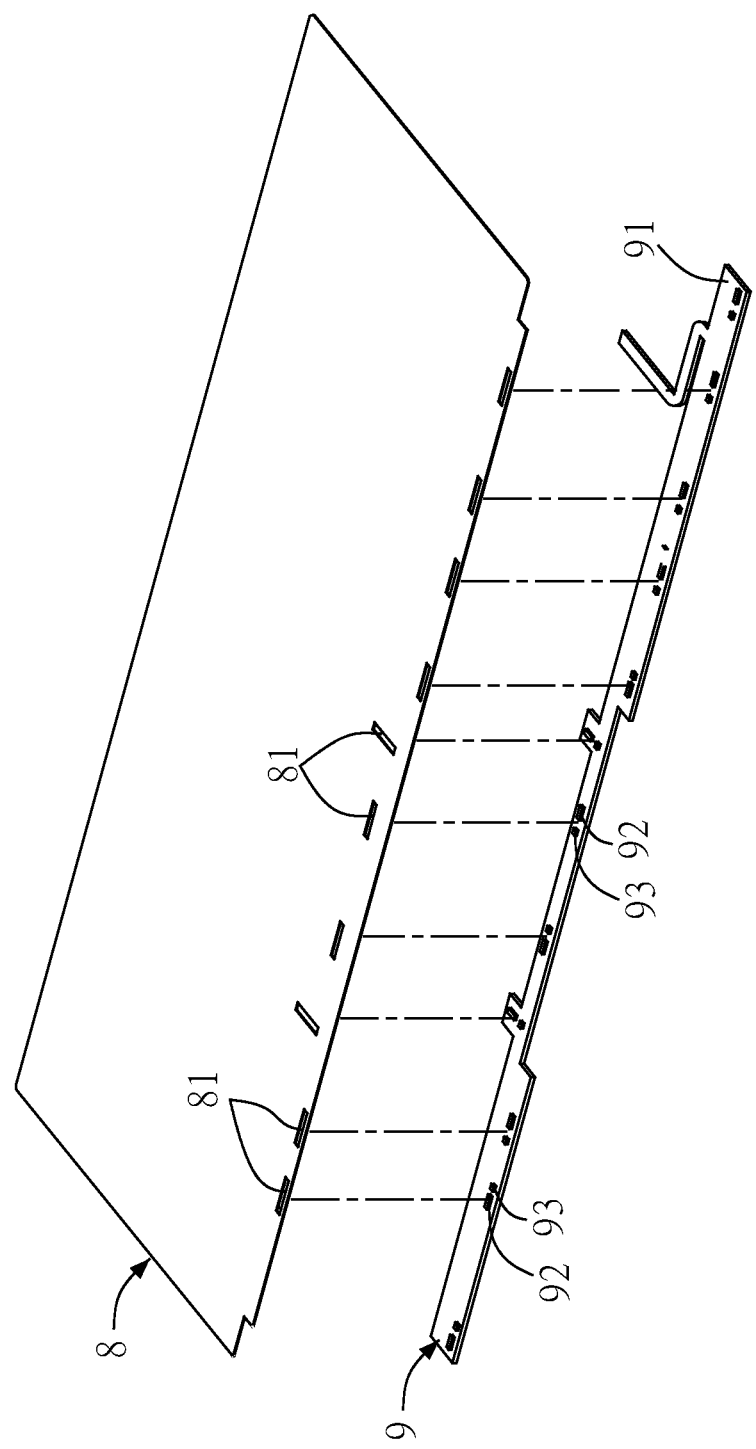
FIG. 1 is a schematic view of a conventional light emitting module and light guiding plate.
Figure 2:
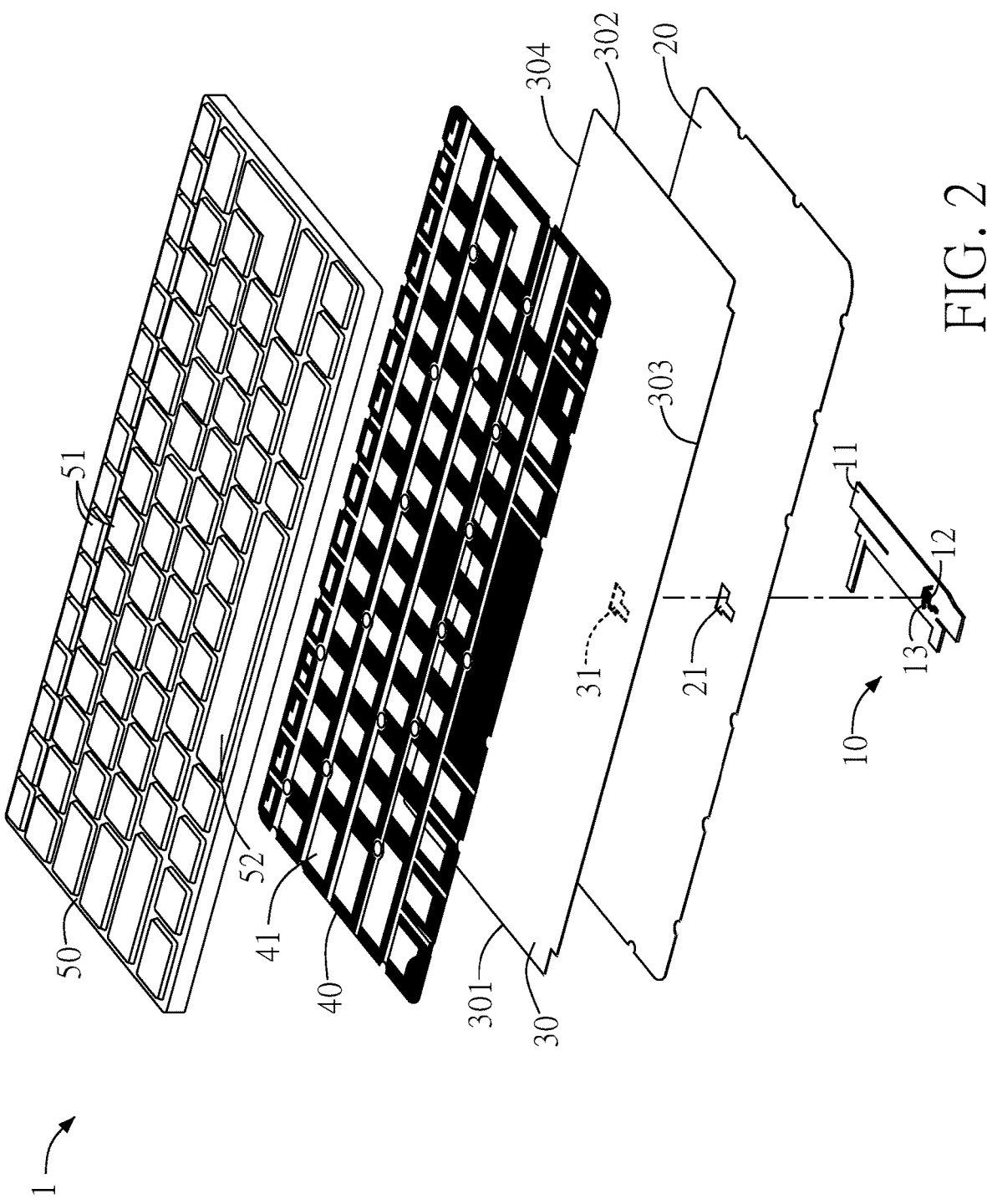
FIG. 2 is an exploded view of an illuminating keyboard in a first embodiment of the present disclosure.
Figure 3:
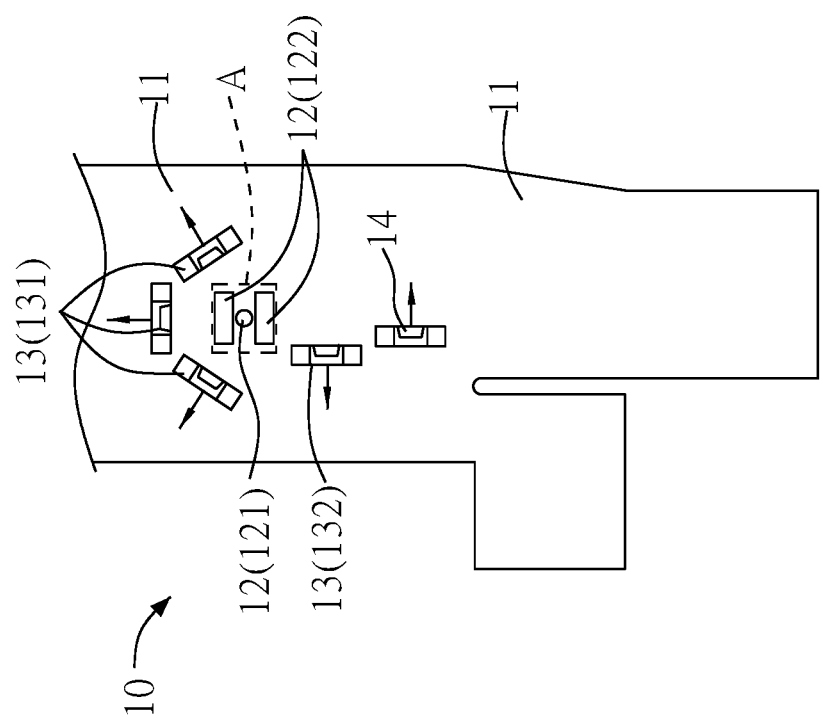
FIG. 3 is a partial schematic diagram of a light emitting module shown in FIG. 2.

FIG. 2 is an exploded view of an illuminating keyboard in a first embodiment of the present disclosure. FIG. 3 is a partial schematic diagram of a light emitting module shown in FIG. 2. Referring to both FIG. 1 and FIG. 2, in the present embodiment, the illuminating keyboard 1 includes a light emitting module 10, a reflection plate 20, a light guiding plate 30, a light-shielding film 40, and a key module 50. Specifically, the light emitting module 10 includes a circuit board 11, a plurality of electronic components 12, and a plurality of light emitting units 13. The electronic components 12 can be, for example but not limited to, a resistor 121 or a capacitor 122, and the electronic components 12 are collectively disposed in an area A of the circuit board 11. The light emitting units 13 surround the area A of the circuit board 11. In other words, the electronic components 12 and the light emitting units 13 are both disposed on the circuit board 11, and the circuit board 11 has a virtual area A (as shown in dashed lines in FIG. 3). The electronic components 12 (including the resistor 121 and the capacitor 122) are collectively disposed in the area A. The light emitting units 13 are disposed around the area A and located at the periphery of the electronic components 12. Specifically, the light from the light emitting units 13 are directed outside the area A (as indicated by the arrow symbol in FIG. 3).

As shown in FIG. 2, the reflection plate 20 is disposed above the circuit board 11, and has a through hole 21 to correspond to the light emitting units 13. The light guiding plate 30 is disposed above the reflection plate 20, and the light guiding plate 30 has a slot hole 31 corresponding to the through hole 21. Accordingly, the light emitting units 13 can be accommodated in the spaced formed by the through hole 21 and the slot hole 31. Since the light emitting units 13 surround the area A and locate at the periphery of the electronic components 12, the size (width or length) of the circuit board 11 can be reduced, and the reflection plate 20 can only be provided with one through hole 21. Thus, the light guiding plate 30 also only needs to have one slot hole 31. Moreover, reducing the size of the circuit board 11 can achieve the effect of reducing the manufacturing cost of the light emitting module 10.

In the present embodiment, the light-shielding film 40 is disposed above the light guiding plate 30, and the key module 50 is disposed above the light-shielding film 40. Specifically, the light-shielding film 40 has a light emission district 41. Each of the light emission district 41 corresponds to each key 51 of the key module 50. That is, the light emission district 41 corresponds to the configuration of the key 51. Since the light emitting units 13 are accommodated in the space formed by the through hole 21 and the slot hole 31, and the light from the light emitting units 13 are directed outside the area A, the light emitted by the light emitting units 13 can enter the light guiding plate 30 from the side wall of the slot hole 31. The light guiding plate 30 receives the light from the light emitting units 13, and guides the light to the entirety of the light guiding plate 30 to provide sufficient brightness. Part of the light is emitted from the light guiding plate 30 and passes through the light emission district 41 of the light-shielding film 40, and is then emitted to the outside by the key module 50, thereby achieving the effect of illuminating.

Figure 4:
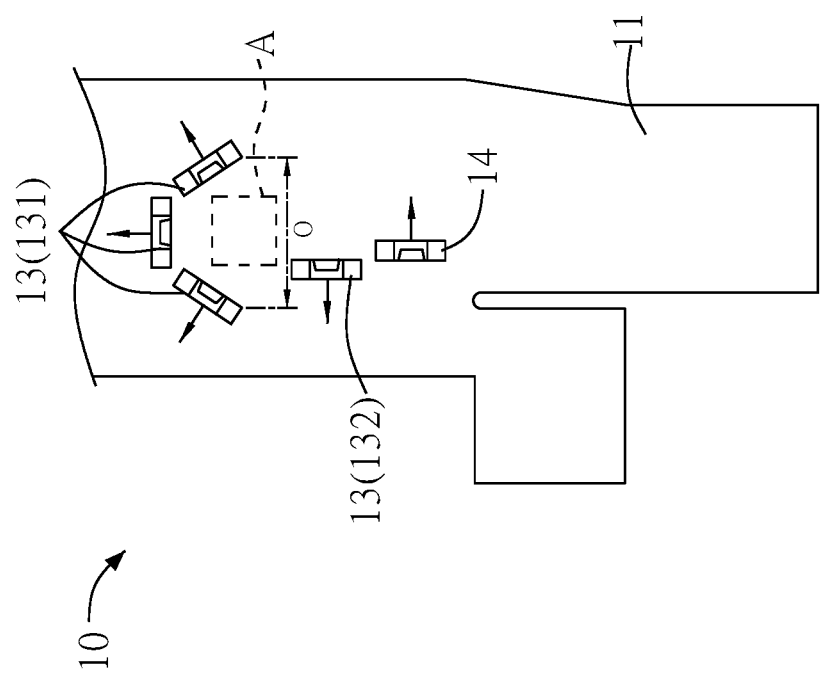
FIG. 4 is a schematic diagram showing the configuration of the light emitting units in FIG. 3.

FIG. 4 is a schematic diagram showing the configuration of the light emitting units in FIG. 3. Referring to FIG. 4, in the embodiment, some of the light emitting units 13 are configured in an arc shape and form a curved opening O. One of the light emitting units 13 is disposed at the curved opening O. Specifically, the three light emitting units 131 on the upper side of the circuit board 11 shown in FIG. 4 are configured in a semicircular (arc) shape and form a curved opening O. One of the light emitting units 13 (referred as the light emitting unit 132) is disposed below the curved opening O. Further, the light of the light emitting units 131 and the light emitting unit 132 is emitted away from the area A, such that the light can enter the light guiding plate 30 from the side wall of the slot hole 31.

Preferably, the light emitting module 10 further includes a reverse light emitting unit 14, and the direction from which the light is emitted is opposite to the direction from which the light from the light emitting unit 132 is emitted. It should be noted that the structure of the reverse light emitting unit 14 is the same as that of the above-described light emitting units 13, as the light is emitted in the opposite direction to the light emitting unit 132, it is referred to herein as a reverse light emitting unit 14. Further, the reverse light emitting unit 14 is located adjacent to the light emitting unit 132 which is located at the curved opening O, and the reverse light emitting unit 14 is located at an end of the light emitting unit 132 away from the curved opening O. In other words, the reverse light emitting unit 14 is farther away from the curved opening O than the light emitting unit 132.

In this embodiment, the light emitting units 13 and the reverse light emitting unit 14 are disposed adjacent to one side of the key module 50, or preferably adjacent to the bottom side of the key module 50. Specifically, when the light emitting module 10 is disposed under the key module 50, the position of the slot hole 31 is designed to be adjacent to the bottom side of the key module 50. Accordingly, the light emitting units 13 and the reverse light emitting unit 14 can be both disposed adjacent to the bottom side of the key module 50. Preferably, the light emitting units 13 and the reverse light emitting unit 14 may correspond to a multi-length key 52 of the key module 50, such as a spacebar.

As shown in FIG. 2, the light guiding plate 30 has two short side walls 301, 302 opposite to each other respectively and two long side walls 303, 304 opposite to each other respectively. In this embodiment, the slot hole 31 is close to the long side wall 303 of the lower side, such that the brightness on the lower side of the light guiding plate 30 is sufficient. Referring to both FIG. 2 and FIG. 4, the light emitting units 131 emit light in a direction toward the upper long side wall 304 such that light can be directed to the upper side of the light guiding plate 30. Moreover, the light from the light emitting unit 132 is directed toward the short side wall 301 on the left side, and the light from the reverse light emitting unit 14 is directed toward the short side wall 302 on the right side. Thus, the light can be directed to the left and right sides of the light guiding plate 30. In other words, through the configuration of the light emitting units 131, 132 and the reverse light emitting unit 14, the light can be evenly directed to the short side walls 301, 302 and the long side walls 303, 304 of the light guiding plate 30 to achieve the same brightness and evenness as the light emitting units 92 configured in the conventional row or column configuration. In other words, the configuration of the light emitting units 13 and the reverse light emitting unit 14 in this embodiment can replace the conventional row or column configuration.

As shown in FIG. 1, the conventional light emitting units 92 are configured in a column or a row configuration on the light guiding plate 8, such that the light guiding plate 8 needs to have a plurality of holes 81. However, energy losses are caused due to light leaking when light emitted from the light emitting units 92 passes through the plurality of holes 81. The light emitting units 13 and the reverse light emitting unit 14 in this embodiment are both disposed in the slot hole 31 of the light guiding plate 30, such that the light guiding plate 30 can effectively receive the light emitted by the light emitting units 13 and the reverse light emitting unit 14, to further avoid the loss of energy. Moreover, the light guiding plate 30 is designed to only need one slot hole 31. This makes the design of the optical path of the light emitting units 13 more simplified.

Figure 5:
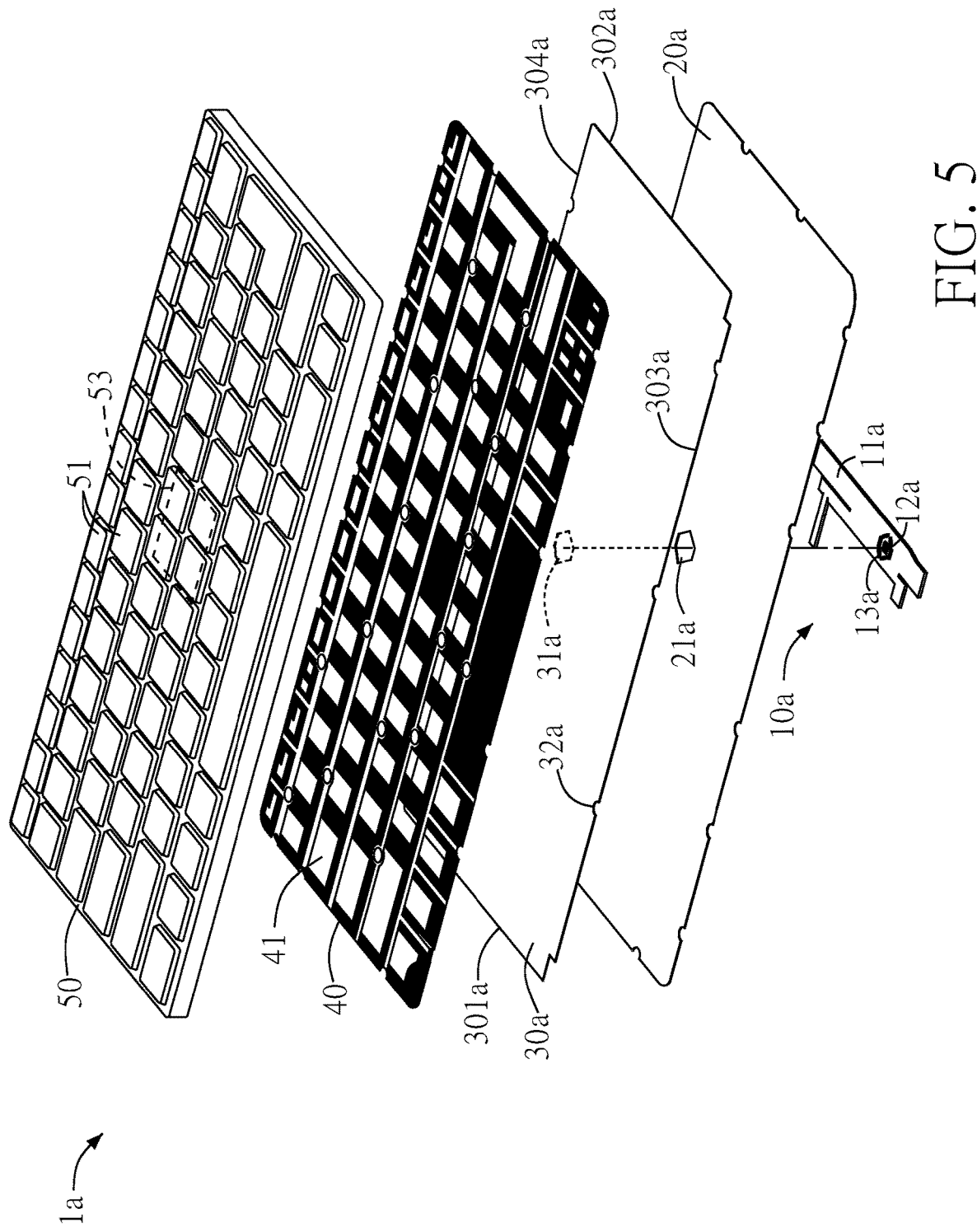
FIG. 5 is an exploded view of an illuminating keyboard in a second embodiment of the present disclosure.
Figure 6:
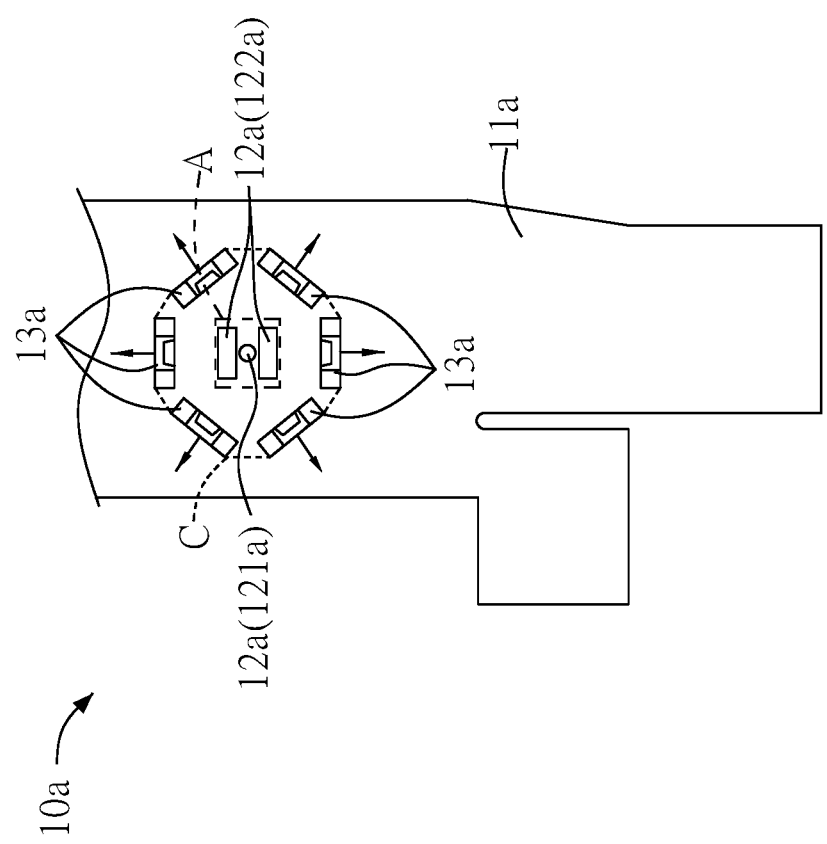
FIG. 6 is a partial schematic diagram of the light emitting module shown in FIG. 5.

FIG. 5 is an exploded view of an illuminating keyboard in a second embodiment of the present disclosure. FIG. 6 is a partial schematic diagram of the light emitting module shown in FIG. 5. Referring to both FIG. 5 and FIG. 6, the difference between the illuminating keyboard 1a in the present embodiment and the first embodiment is the configuration of the light emitting units 13a of the light emitting module 10a. Correspondingly, the position of the through hole 21a of the reflection plate 20a and the slot hole 31a of the light guiding plate 30a are designed different from that of the first embodiment. Other components that are identical to the first embodiment, such as the light-shielding film 40 and the key module 50, use the aforementioned reference numerals.

In the present embodiment, the plurality of light emitting units 13a are configured to form a closed shape C, as shown by the dotted line in FIG. 6. Specifically, the closed shape C can be round or polygonal. Similarly, the electronic components 12a are collectively disposed in the area A of the circuit board 11a, the light emitting units 13a surround the area A, and the light from the light emitting units 13a are directed outside the area A. Preferably, the light emitting units 13a correspond to the central district 53 of the key module 50. Specifically, the through hole 21a of the reflection plate 20a and the slot hole 31a of the light guiding plate 30a are both designed to correspond to the central district 53 of the key module 50. Therefore, when the light emitting units 13a are accommodated in the space formed by the through hole 21a and the slot hole 31a, the light emitting units 13a can correspond to the central district 53 of the key module 50 at the same time.

Since the light emitting units 13a are configured in a closed shape C, and the light from the light emitting units 13a are directed outside the area A, after the light guiding plate 30a receives the light emitted by the light emitting units 13a from the side wall of the slot hole 31a, the light is evenly directed to the two short side walls 301a, 302a and the two long side walls 303a, 304a. Similarly, the design that the light emitting units 13a of this embodiment is configured in a closed shape C can achieve the same brightness and evenness as the light emitting units 92 configured in a conventional row or column configuration and can replace the conventional row or column configuration.

Figure 7:
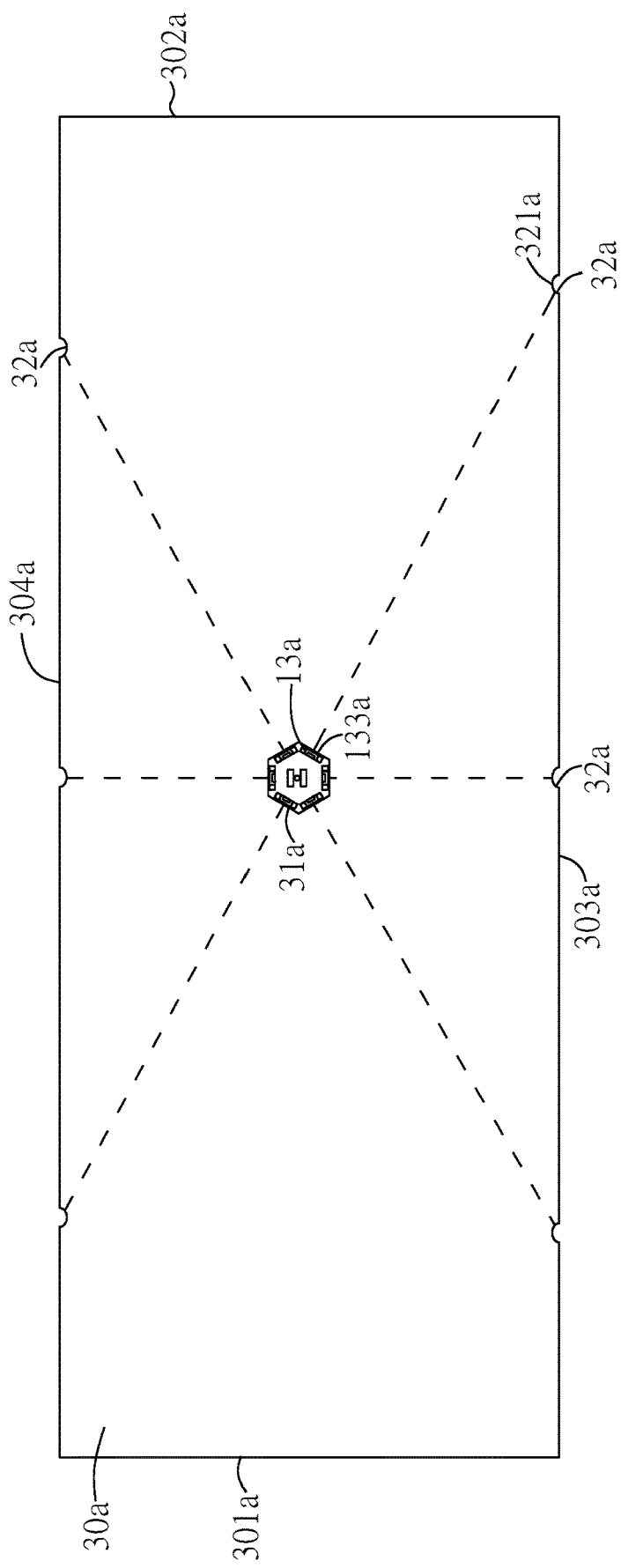
FIG. 7 is a top view of the light guiding plate and the light emitting units shown in FIG. 5.

FIG. 7 is a top view of the light guiding plate and the light emitting units shown in FIG. 5. Referring to FIG. 7, preferably, the light guiding plate 30a is further provided with a plurality of reflection portions 32a, and the reflection portions 32a may be disposed on the short side wall 301a, 302a, or the long side wall 303a, 304a. This embodiment takes the latter as an example. Specifically, each of the reflection portions 32a is located respectively along a normal direction of a light output surface 133a of one of the light emitting units 13a (shown by a broken line in FIG. 7). That is, the reflection portions 32a are disposed at the position where the extension lines (shown by broken lines in FIG. 7) perpendicular to the light output surface 133a intersect the long side walls 303a, 304a. The light emitting module 10a of the present embodiment is illustrated by taking six light emitting units 13a as an example. Accordingly, six reflection portions 32a are provided on the long side wall 303a, 304a. Preferably, the reflection portions 32a respectively have a curved reflection surface 321a. Specifically, the reflection portions 32a may be holes and have a curved reflection surface 321a for reflecting light to other positions of the light guiding plate 30a, which makes the brightness distribution more even. In other embodiments, the reflection portions 32a may also be a convex structure, and may also have a curved reflection surface 321a, but the present disclosure is not limited thereto.

Figure 8:
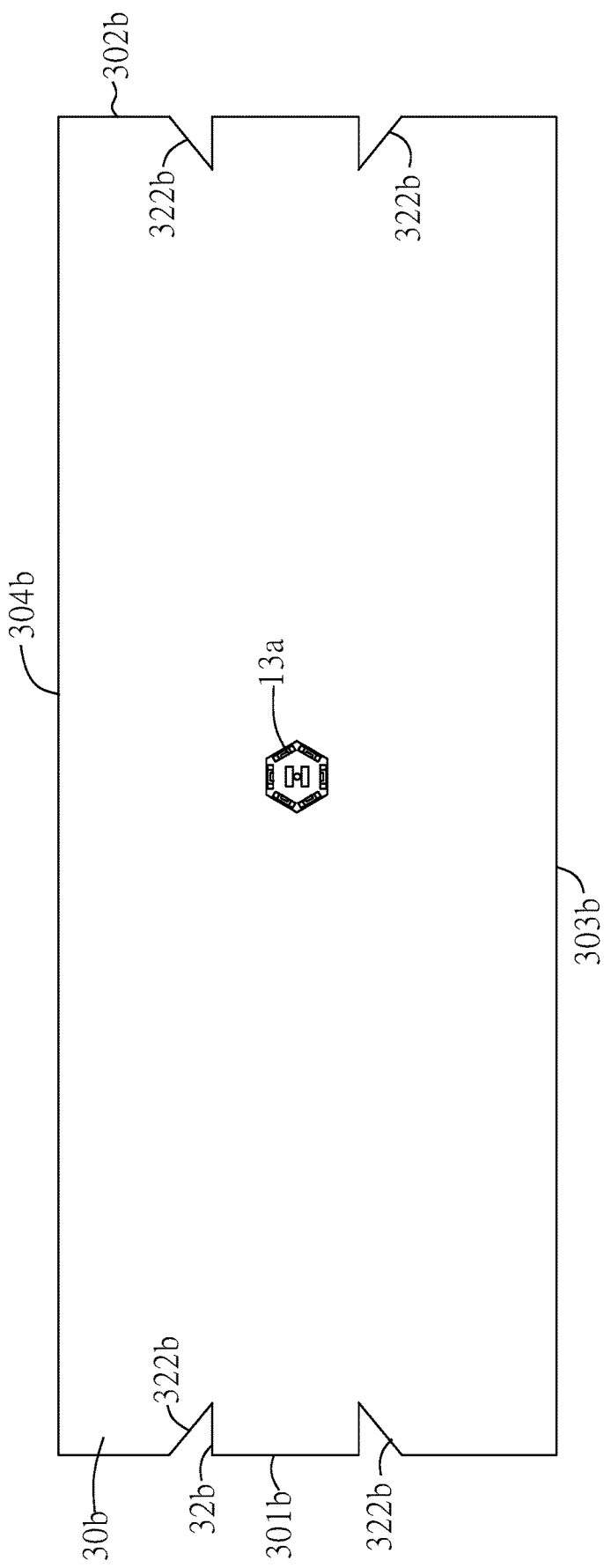
FIG. 8 is a top view of the light guiding plate in a third embodiment of the present disclosure.

FIG. 8 is a top view of the light guiding plate in a third embodiment of the present disclosure. Referring to FIG. 8, in this embodiment, the light guiding plate 30b also includes a plurality of reflection portions 32b, and the reflection portions 32b are disposed on the short side wall 301b, 302b. In this embodiment, the reflection portions 32b are triangular holes or microstructures such that the reflection portions 32b have an oblique reflection surface 322b, and the oblique reflection surface 322b faces a designated area of the light guiding plate 30b. It should be noted that the designated area refers to the dark area caused by the uneven distribution of light, such as the four corners of the light guiding plate 30b. As the light from the light emitting units 13a (followed by reference numerals in the second embodiment) are reflected by the oblique reflection surface 322b and then directed to the designated area of the light guiding plate 30b, the effect that the brightness distribution is more even can be achieved.

It should be noted that, the reflection portions 32a of the second embodiment and the reflection portions 32b of the third embodiment may also be applied to the light guiding plate 30 of the first embodiment, but the present disclosure is not limited thereto.

Figure 9:
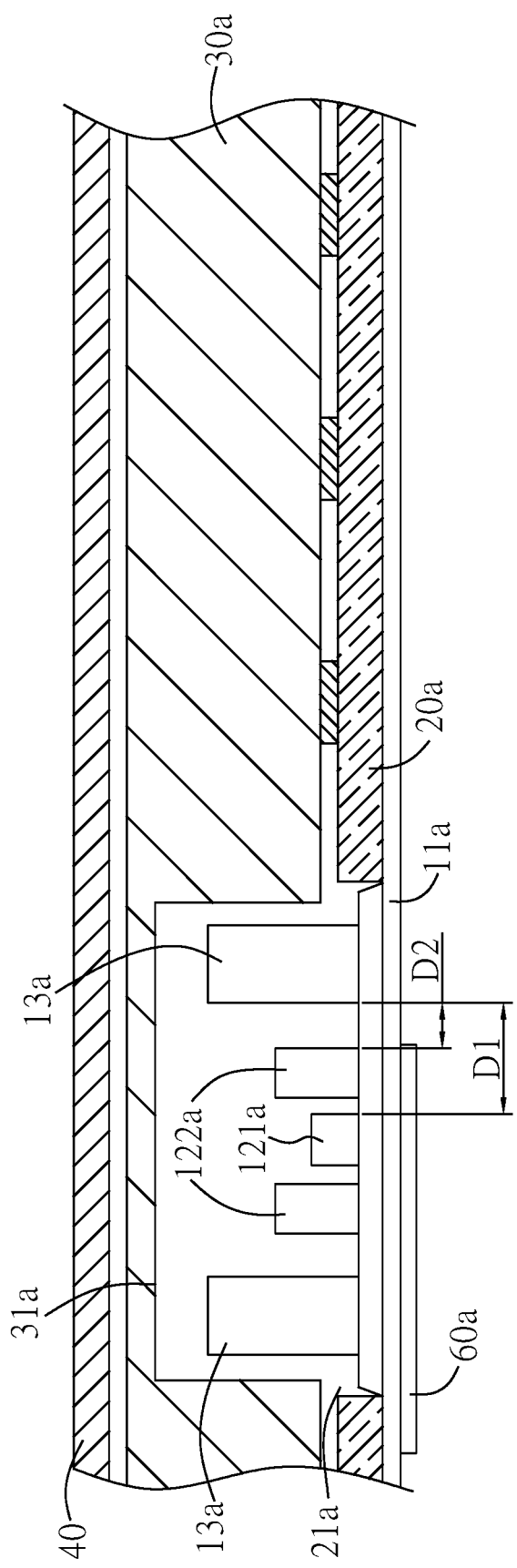
FIG. 9 is a partial cross-sectional view showing the assembly of the light emitting module, a reflection plate, the light guiding plate, and a light-shielding film in FIG. 5.

FIG. 9 is a partial cross-sectional view showing the assembly of the light emitting module, a reflection plate, the light guiding plate, and a light-shielding film in FIG. 5. Referring to FIG. 9, the electronic components 12a and the light emitting units 13a are accommodated in the space formed by the through hole 21a and the slot hole 31a. In this embodiment, the illuminating keyboard 1a further includes a supporting plate 60a, which is disposed below the circuit board 11a and corresponds to the slot hole 31a. The supporting plate 60a can support components such as electronic components 12a and light emitting units 13a to avoid the problem that the light guiding plate 30a has insufficient structural strength due to the configuration of the slot hole 31a. In addition, the supporting plate 60a may be, for example, but not limited to, a polyethylene terephthalate (PET) or a polyimide (PI) plastic plate, preferably a metal plate such as aluminum or iron. Therefore, the supporting plate 60a be used to increase the structural strength. Moreover, the heat dissipation characteristics of the metal material can be utilized to achieve the effects of support and heat dissipation.

Further, the electronic components 12a in the present embodiment further include a resistor 121a and two capacitors 122a. Preferably, the shortest distance D1 between the resistor 121a and the light emitting units 13a is greater than the shortest distance D2 between the capacitors 122a and the light emitting units 13a. In other words, from the side wall of the slot hole 31a to the inside, the light emitting units 13a, the capacitors 122a, and the resistor 121a are configured in sequence. Since the light emitting units 13a and the resistor 121a generate more heat than the capacitors 122a, the capacitors 122a generating a smaller amount of heat are configured between the light emitting units 13a and the resistor 121a, thereby the heat dissipation effect is increased. Preferably, the supporting plate 60a can also be made of a material with high thermal conductivity for better heat dissipation.

Similarly, the configuration of the supporting plate 60a, the resistor 121a, and the capacitor 122a in this embodiment can be also applied to the illuminating keyboard 1 in the first embodiment, but the present disclosure is not limited thereto.

As described above, the illuminating keyboard according to the present disclosure includes the light emitting module, the reflection plate, and the light guiding plate. Specifically, the design about the electronic components of the light emitting module being collectively disposed in an area of the circuit board and the light emitting units surrounding the area of the circuit board can reduce the size (width or length) of the circuit board to reduce the manufacturing cost of the light emitting module. Moreover, the light guiding plate only needs to be provided with one slot hole. This can avoid the loss of energy and make the design of the optical path of the light emitting units more simplified.

Furthermore, the light emitting units are accommodated in the space formed by the through hole and the slot hole, and the light from the light emitting units are directed outside the area, such that the light from the light emitting units can enter the light guiding plate from the side wall of the slot hole and be directed to the whole light guiding plate to provide sufficient and evenly distributed brightness.

Additionally, the light guiding plate is further provided with a plurality of reflection portions, and the reflection portions may be disposed on the short side wall, or the long side wall, to make the brightness distribution more even.

Additionally, the illuminating keyboard further includes a supporting plate disposed below the circuit board to avoid the problem that the light guiding plate has insufficient structural strength due to the configuration of the slot hole. Furthermore, the heat dissipation feature can be utilized to achieve the support and heat dissipation effect at the same time.

It should be noted that the described embodiments are only for illustrative and exemplary, and that various changes and modifications may be made to the described embodiments without departing from the scope of the disclosure as disposed by the appended claims.

What is claimed is:

1. An illuminating keyboard, comprising:
    a light emitting module, comprising a circuit board, a plurality of electronic components, and a plurality of light emitting units, wherein the electronic components are collectively disposed in an area of the circuit board, the light emitting units surround the area of the circuit board, and the light from the light emitting units is directed outside the area;
    a reflection plate disposed above the circuit board and having a through hole corresponding to the light emitting units;
    a light guiding plate disposed above the reflection plate and having a slot hole corresponding to the through hole, the light emitting units being accommodated in the space formed by the through hole and the slot hole, and the light guiding plate receiving the light from the light emitting units;
    a light-shielding film disposed above the light guiding plate, and having a light emission district; and
    a key module disposed above the light-shielding film, wherein the light emission district corresponds to the key module, and the light is emitted from the light guiding plate, passing through the light emission district, and emitted from the key module to the outside.

2. The illuminating keyboard as claimed in claim 1, wherein some of the light emitting units are configured in an arc shape and form a curved opening, and one of the light emitting units is disposed at the curved opening.

3. The illuminating keyboard as claimed in claim 2, wherein the light emitting module further comprising a reverse light emitting unit, light emitted from the reverse light emitting unit is in the opposite direction to the light from the light emitting unit located at the curved opening, the reverse light emitting unit being located adjacent to one end of the light emitting unit located at the curved opening, and the one end is farther away from the curved opening.

4. The illuminating keyboard as claimed in claim 3, wherein the light emitting units and the reverse light emitting unit are located adjacent to one side of the key module.

5. The illuminating keyboard as claimed in claim 1, wherein the configuration of the light emitting units forms a closed shape.

6. The illuminating keyboard as claimed in claim 5, wherein the light emitting units corresponds to a central district of the key module.

7. The illuminating keyboard as claimed in claim 1, wherein the electronic components comprise at least a resistor and at least a capacitor, and the shortest distance between the resistor and the light emitting units is greater than the shortest distance between the capacitor and the light emitting units.

8. The illuminating keyboard as claimed in claim 1, wherein the light guiding plate has two short side walls opposite to each other respectively and two long side walls opposite to each other respectively, the light guiding plate further comprising a plurality of reflection portions disposed on the two short side walls or the two long side walls.

9. The illuminating keyboard as claimed in claim 8, wherein the reflection portions are disposed on the two long side walls, and each of the reflection portions is located respectively along the normal direction of a light output surface of one of the light emitting units.

10. The illuminating keyboard as claimed in claim 9, wherein each of the reflection portions has a curved reflection surface.

11. The illuminating keyboard as claimed in claim 10, wherein the reflection portions are holes.

12. The illuminating keyboard as claimed in claim 8, wherein the reflection portions are disposed on the two short side walls and have an oblique reflection surface, and the oblique reflection surface faces a designated area of the light guiding plate.

13. The illuminating keyboard as claimed in claim 12, wherein the reflection portions are holes.

14. The illuminating keyboard as claimed in claim 1, further comprising: a supporting plate, which is disposed below the circuit board and corresponding to the slot hole.

15. The illuminating keyboard as claimed in claim 14, wherein the supporting plate has high thermal conductivity.

* * * * *